United States Patent
Kim et al.

(10) Patent No.: US 10,056,945 B2
(45) Date of Patent: Aug. 21, 2018

(54) PROCESSING METHOD FOR LEAKAGE POWER AND ELECTRONIC DEVICE SUPPORTING THE SAME

(71) Applicant: Samsung Electronics Co., Ltd., Suwon-si, Gyeonggi-do (KR)

(72) Inventors: Dong Zo Kim, Yongin-si (KR); Kwang Seob Kim, Suwon-si (KR); Se Ho Park, Yongin-si (KR); Yu Su Kim, Yongin-si (KR); Han Seok Park, Seoul (KR); Keum Su Song, Seoul (KR); Ju Hyang Lee, Suwon-si (KR); Min Cheol Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/412,764

(22) Filed: Jan. 23, 2017

(65) Prior Publication Data
US 2017/0279495 A1 Sep. 28, 2017

(30) Foreign Application Priority Data
Mar. 28, 2016 (KR) .................. 10-2016-0036881

(51) Int. Cl.
*H04B 5/00* (2006.01)
*H04M 1/00* (2006.01)
(Continued)

(52) U.S. Cl.
CPC ........... *H04B 5/0037* (2013.01); *H01Q 1/243* (2013.01); *H02J 50/10* (2016.02); *H02J 50/12* (2016.02);
(Continued)

(58) Field of Classification Search
CPC ........ H04B 1/086; H04B 1/3827; H04B 5/00; H04B 5/0037; H04B 5/0075;
(Continued)

(56) References Cited

U.S. PATENT DOCUMENTS

| | | | |
|---|---|---|---|
| 6,906,489 B2 | 6/2005 | Fukamizu et al. | |
| 8,823,219 B2* | 9/2014 | Farahani | H01Q 1/248 307/154 |
| 9,124,122 B2* | 9/2015 | Kim | H02J 5/005 |
| 9,142,996 B2* | 9/2015 | Kim | H02J 5/005 |
| 9,461,364 B2 | 10/2016 | Lee et al. | |
| 9,509,374 B2* | 11/2016 | Kim | H02J 7/025 |
| 9,601,272 B2* | 3/2017 | Ahn | H01F 38/14 |
| 9,685,699 B2* | 6/2017 | Mahanfar | H01Q 1/521 |
| 2004/0232874 A1 | 11/2004 | Fukamizu et al. | |
| 2013/0113422 A1 | 5/2013 | Lee et al. | |

(Continued)

FOREIGN PATENT DOCUMENTS

| EP | 2 590 257 A2 | 5/2013 |
|---|---|---|
| JP | 2004-274880 A | 9/2004 |

(Continued)

OTHER PUBLICATIONS

European Search Report dated Jul. 31, 2017, issued in the European Application No. 17153597.4.

*Primary Examiner* — Quochien B Vuong
(74) *Attorney, Agent, or Firm* — Jefferson IP Law, LLP

(57) ABSTRACT

A leakage power processing method of an electronic device including a first conductive pattern that sends and receives a communication signal associated with a communication function, a second conductive pattern that is arranged adjacent to the first conductive pattern and sends and receives a power signal used for charging, and a communication hardware interface electrically connected with the first conductive pattern is provided. The leakage power processing method includes determining, by a processor of an electronic device, whether a specific power signal is induced through the second conductive pattern and forming, by the processor of the electronic device, a closed loop including the first conductive pattern if the specific power signal of a specific magnitude or greater is induced.

17 Claims, 12 Drawing Sheets

(51) Int. Cl.
*H01Q 1/24* (2006.01)
*H02J 50/10* (2016.01)
*H02J 50/12* (2016.01)
*H02J 50/80* (2016.01)

(52) U.S. Cl.
CPC ............ *H02J 50/80* (2016.02); *H04B 5/0031* (2013.01); *H04B 5/0081* (2013.01)

(58) Field of Classification Search
CPC ..... H04B 5/0087; H04B 5/02; H04M 1/7253; H04M 2250/02; H04M 2250/04; H04W 4/008; H04W 88/02; H02J 5/005; H02J 7/025; H02J 50/10
USPC ......... 455/41.1, 41.2, 552.1, 553.1, 572.573, 455/572, 573
See application file for complete search history.

(56) References Cited

U.S. PATENT DOCUMENTS

| | | |
|---|---|---|
| 2015/0001956 A1 | 1/2015 | Saen et al. |
| 2015/0280429 A1 | 10/2015 | Makita et al. |
| 2016/0020600 A1 | 1/2016 | Mori et al. |
| 2016/0308401 A1 | 10/2016 | Lee et al. |

FOREIGN PATENT DOCUMENTS

| | | | | |
|---|---|---|---|---|
| JP | WO 2015099065 A1 * | 7/2015 | ............. | H02J 5/005 |
| KR | 10-2012-0128546 A | 11/2012 | | |
| KR | 10-2017-0058206 A | 5/2017 | | |
| WO | 2015/099065 A1 | 7/2015 | | |

\* cited by examiner (801)

(803)

<903>

PROCESSING METHOD FOR LEAKAGE POWER AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Mar. 28, 2016 in the Korean Intellectual Property Office and assigned Serial number 10-2016-0036881, the entire disclosure of which is hereby incorporated by reference.

TECHNICAL FIELD

The present disclosure relates to leakage power processing. In particular, a leakage power processing process that is capable of safely protecting an electronic device by processing leakage power due to a power signal and an electronic device supporting the same.

BACKGROUND

A portable electronic device uses a battery. An electronic device according to the related art may use a secondary battery, which is rechargeable, as a power source. The electronic device according to the related art has charged a battery by using a charging cable. Nowadays, the electronic device has used a system, which is capable of charging a battery in a wireless manner, instead of a system capable of charging the battery based on the charging cable. In this regard, a wireless charging device may wirelessly send a power signal based on a frequency, and the electronic device may receive the power signal by using an antenna.

Meanwhile, the electronic device according to the related art includes a communication module that communicates based on a frequency bandwidth. Accordingly, since leakage power of the power signal associated with wireless charging is induced to the communication module, a communication module or elements associated with the communication module may be damaged.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a leakage power processing method that is capable of safely protecting an electronic device by processing leakage power due to a power signal and an electronic device supporting the same.

In accordance with an aspect of the present disclosure, an electronic device is provided. The electronic device includes a first conductive pattern that sends and receives a signal with regard to a communication function, a second conductive pattern that is arranged adjacent to the first conductive pattern and sends and receives a signal with regard to charging, a communication hardware interface connected with the first conductive pattern, a processor electrically connected with the communication hardware interface. The processor is configured to control the communication hardware interface such that a closed loop including the first conductive pattern is formed if a signal of a magnitude or greater is supplied through the second conductive pattern.

In accordance with another aspect of the present disclosure, a leakage power processing method of an electronic device is provided. The leakage power processing method of an electronic device includes a first conductive pattern that sends and receives a signal associated with a communication function, a second conductive pattern that is arranged adjacent to the first conductive pattern and sends and receives a signal used for charging, and a communication hardware interface electrically connected with the first conductive pattern. The leakage power processing method includes determining, by a processor of the electronic device, whether a specific power signal of a specified magnitude or greater is induced through the second conductive pattern and forming, by the processor of the electronic device, a closed loop including the first conductive pattern if the specific power signal of the specified magnitude or greater is induced.

In accordance with another aspect of the present disclosure, an electronic device is provided. The electronic device includes a first conductive pattern for communication that sends and receives a signal with regard to operating a first communication function, a second conductive pattern for communication that sends and receives a signal with regard to operating a second communication function, a first conductive pattern for charging that is arranged adjacent to the first conductive pattern for communication and sends and receives a signal associated with charging, a second conductive pattern for charging that is arranged adjacent to the second conductive pattern for communication and sends and receives a signal associated with charging, a first communication hardware interface connected with the first conductive pattern for communication, a second communication hardware interface connected with the second conductive pattern for communication, and a processor electrically connected with the first communication hardware interface or the second communication hardware interface. The processor is configured to verify a charging type if a charging event is generated and to form a closed loop including the first conductive pattern for communication or a closed loop including the second conductive pattern for communication based on the charging type.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
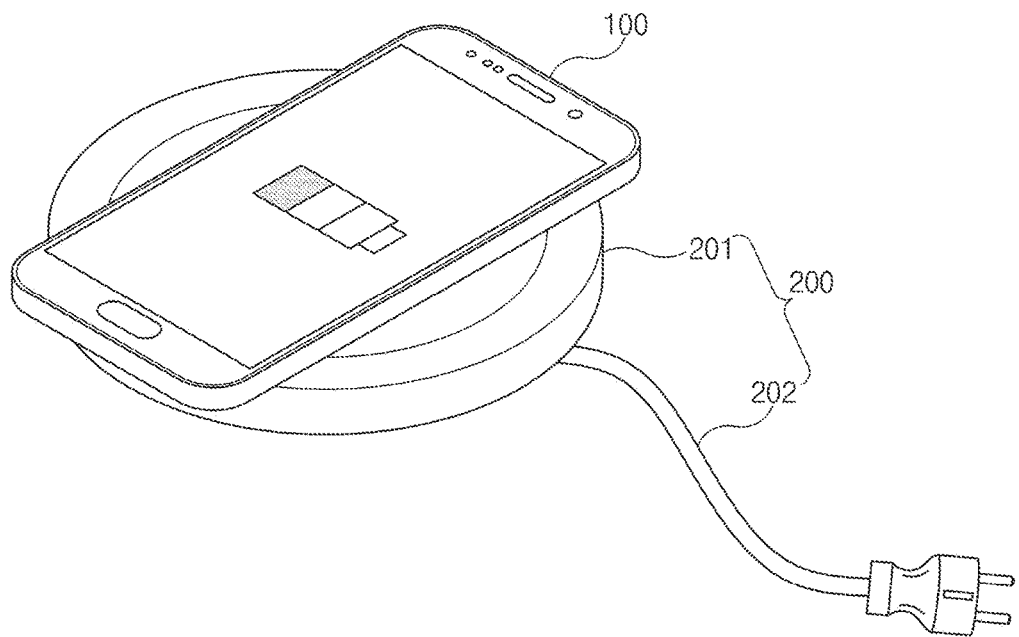
FIG. 1 is a drawing illustrating a wireless charging environment of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a drawing illustrating a wireless charging environment of an electronic device according to an embodiment of the present disclosure.

Referring to FIG. 1, a wireless charging environment of an electronic device according to an embodiment may include an electronic device 100 and a wireless charging device 200.

For example, the wireless charging device 200 may wirelessly send a power signal based on a transmitter antenna or transmitter coil. For example, the wireless charging device 200 may wirelessly send the power signal by using a frequency bandwidth determined by a physical characteristic of the transmitter coil. According to various embodiments, the wireless charging device 200 may periodically determine whether the electronic device 100 is arranged (e.g., whether the electronic device 100 is within a specified distance of the wireless charging device) and may wirelessly send the power signal of a specific magnitude in the case where the electronic device 100 is arranged within a specified distance of the wireless charging device. The wireless charging device 200 may include, for example, a transmitter antenna that sends a charging power signal, a wireless power transmitter that controls the transmitter antenna, a charging case 201 that surrounds the transmitter antenna, a wireless power transmitter, and the like, and a cable 202 connected with an external power.

If the electronic device 100 is arranged on a specific location (e.g., the center area of the charging case 201 or the like) of the wireless charging device 200, the electronic device 100 may receive the power signal, which the wireless charging device 200 provides, and may charge a battery by using the received power signal. In the case where the electronic device 100 according to an embodiment of the present disclosure is in a battery charging state, the electronic device 100 may control a communication module (communication hardware interface or communication circuitry), which operates an antenna (e.g., a conductive pattern for communication) arranged on an area adjacent to a receiver antenna (or a receiver coil, a conductive pattern, or a conductive pattern for charging) associated with battery charging, to form a closed loop associated with the power signal. Alternatively, the electronic device 100 may prevent elements constituting the communication module from being damaged by the power signal induced from a transmitter coil of the wireless charging device 200 or obtained by resonating therewith. In the case where there is no power signal induced from the transmitter coil or obtained by resonating therewith because the charging is completed or ended, the electronic device 100 may switch the state of the communication module to an initial state. Accordingly, the electronic device 100 may economize power for controlling a switch used such that the communication module forms the closed loop associated with the power signal.

Figure 2:
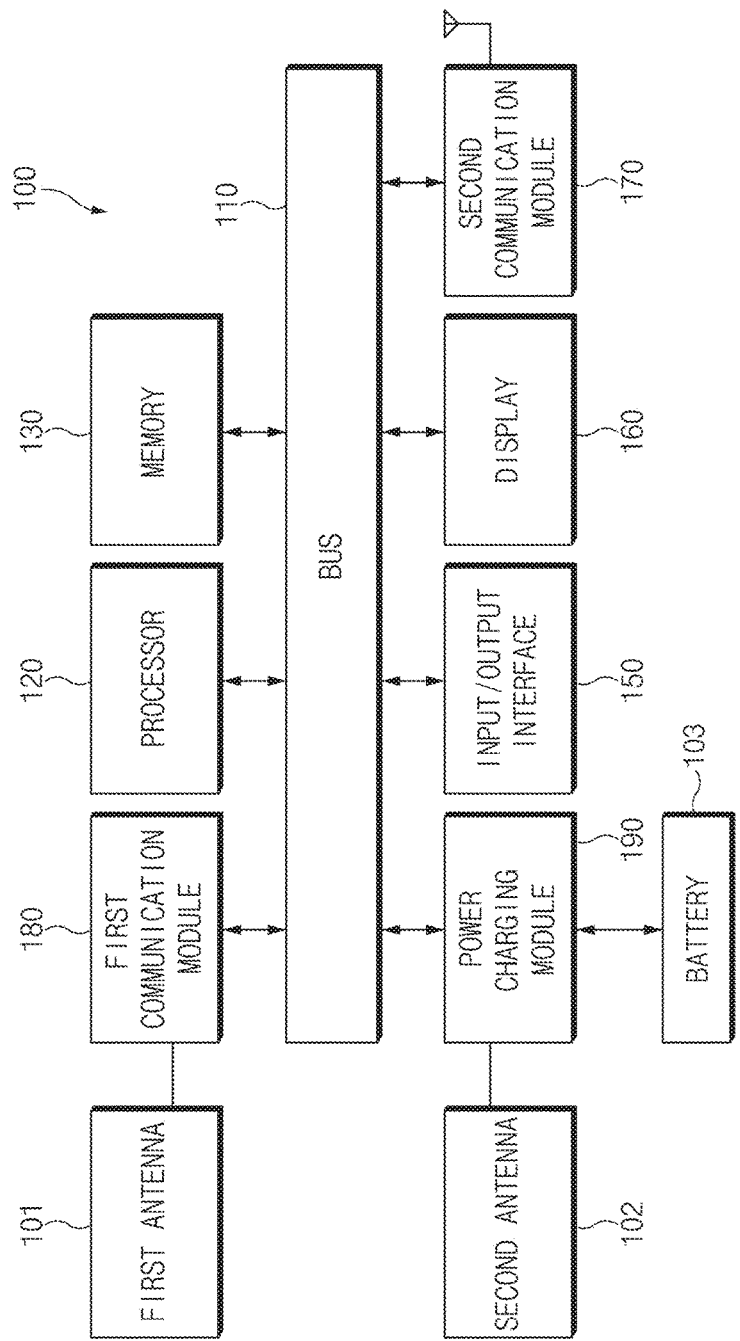
FIG. 2 is a block diagram illustrating an example of an electronic device according to an embodiment of the present disclosure.

FIG. 2 is a block diagram illustrating an example of an electronic device according to an embodiment of the present disclosure.

Referring to FIG. 2, the electronic device 100 may include a bus 110, a processor 120, a memory 130, an input/output interface 150, a display 160, a first communication module 180, a second communication module 170, a power charging module 190, a first antenna 101, a second antenna 102, and battery 103.

The bus 110 may send a signal among elements (e.g., the processor 120, the memory 130, the input/output interface 150, the display 160, the first communication module 180, the second communication module 170, and the power charging module 190) of the electronic device 100. For example, the bus 110 may send, to the processor 120, a recognition signal for recognizing the power charging module 190 of the wireless charging device 200 and may send a closed-loop formation signal to the first communication module 180 under control of the processor 120.

The processor 120 may include, for example, one or more of a CPU, an AP, or a communication processor (CP). The processor 120 may perform, for example, data processing or an operation associated with control and/or communication of at least one other component(s) of the electronic device 100. According to an embodiment, the processor 120 may control the power charging module 190 and first communication module 180. For example, if an event associated with power charging is generated (e.g., receiving a signal or power signal, which the wireless charging device 200 sends, associated with charging), the processor 120 may control the power charging module 190 to charge the battery 103. In this operation, the processor 120 may control the first communication module 180 to form the closed loop. In the case where the power charging is interrupted or completed, the processor 120 may control the first communication module 180 to return to an original state.

The memory 130 may include a volatile and/or nonvolatile memory. For example, the memory 130 may store instructions or data associated with at least one other component(s) of the electronic device 100. According to an embodiment, the memory 130 may store software and/or a program. The program may include, for example, a kernel, a middleware, an application programming interface (API), an application program (or "application"), and/or the like. At least a part of the kernel, the middleware, or the API may be called as an operating system (OS). According to various embodiments, the memory 130 may store at least one instruction associated with control of the first communication module 180 based on a power charging state according to an embodiment of the present disclosure. During the operation of the first communication module 180, data associated with the first communication module 180 stored in the memory 130 may be sent to the first communication module 180 in response to executing the instruction stored in the memory 130. Alternatively, during the power charging, the processor 120 may control the state of the first communication module 180 based on the at least one instruction or an instruction set stored in the memory 130. Alternatively, when the power charging is completed or interrupted, the processor 120 may be configured to restore the state of the first communication module 180 to an original state based on the at least one instruction or the instruction set stored in the memory 130.

The input/output interface 150 may send, to other element(s) of the electronic device 100, an instruction inputted from a user or data inputted from another external device. Furthermore, the input/output interface 150 may output an instruction or data, received from other components of the electronic device 100, to a user or another external device. According to various embodiments, the input/output interface 150 may include an audio device. The audio device may output at least one audio information (e.g., guide information or effect sound, which is previously stored in the memory 130, associated with a power charging start, a state in which a target value of the set charging is reached, a charge completion state, a charge interruption state, whether a communication function is available, or the like) associated with the operation of the power charging module 190.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. According to an embodiment, the display 160 may output a screen associated with the operation of the power charging module 190. For example, in the case where the battery 103 is wirelessly charged by power supplied from the wireless charging device 200, the display 160 may output a screen corresponding to a state in which the battery 103 is wirelessly charged. Alternatively, in the case where wireless charging is completed, the display 160 may output a screen corresponding to the state in which the charging is completed. According to various embodiments, during the wireless charging, the display 160 may output information indicating that a specific function based on the first communication module 180 is not available. In the case where the wireless charging is completed or interrupted, the display 160 may output information indicating that the specific function based on the first communication module 180 is available.

The first communication module 180 may be a communication module that performs a specific function based on data stored in the memory 130. For example, with regard to operating a magnetic secure transmission (MST) function, the first communication module 180 may output a communication signal of a specific frequency under control of the processor 120. Alternatively, the first communication module 180 may communicate with an external electronic device (e.g., a POS device) by using the first antenna 101. According to an embodiment, the first communication module 180 may include at least one of a MST module or a near field communication (NFC) module. In the case where the first communication module 180 includes all of the MST module and the NFC module, the first antenna 101 may include an antenna associated with an operation of the MST module and an antenna associated with an operation of the NFC module. During the wireless charging, the first communication module 180 may control a bridge circuit included in the first communication module 180 to form the closed loop including the first antenna 101 under control of the processor 120. Alternatively, in the case where the wireless charging is completed or interrupted, the first communication module 180 may restore an original state of the bridge circuit under control of the processor 120.

The second communication module 170 may be a communication module supporting a specific communication function (e.g., a mobile communication function or the like) of the electronic device 100. For example, the second communication module 170 may establish a communication channel between the electronic device 100 and an external device (e.g., another electronic device or a server). For example, the communication module 170 may connect to a network through a wireless or wired communication so as to communicate with an external device or server.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Alternatively, the second communication module 170 may include a short range communication module (e.g., Bluetooth (BT) or wireless fidelity (WIFI) communication hardware interface) that communicates with another electronic device. The second communication module 170 according to various embodiments may include a communication module that performs scanner communication or the like. The electronic device 100 may further include at least one specific antenna with regard to an operation of the second communication module 170.

The power charging module 190 may control charging of the battery 103 of the electronic device 100. For example, in the case where the power charging module 190 is connected with the second antenna 102 and the second antenna 102 receives a power signal that the wireless charging device 200 sends, the power charging module 190 may charge the battery 103 by using the received power signal.

The first antenna 101 may be connected with the first communication module 180 and may send a communication signal or may send and receive the communication signal through the first communication module 180. For example, the first antenna 101 may include at least one of an antenna for MST or an antenna for NFC. The antenna for MST may be longer than the antenna for NFC with regard to operating a relatively low frequency. According to various embodiments, the first antenna 101 (e.g., a conductive pattern for communication) may include an antenna having volume or length similar to that of the second antenna 102 (e.g., a conductive pattern for charging). Alternatively, one or more turns of the first antenna 101 may correspond to the multiplication number ('N' times, hereinafter, 'N' is a natural number) of the second antenna 102. The first antenna 101 may receive at least a part (e.g., leakage power) of the power signal, which the wireless charging device 200 wirelessly sends, in an induction or resonance manner.

The second antenna 102 may be connected with the power charging module 190. The second antenna 102 may be arranged with an antenna that is installed in the wireless charging device 200. As such, after receiving the power signal that the wireless charging device 200 provides, the second antenna 102 may send the power signal to the power charging module 190. For example, the second antenna 102 may receive the power signal, which the wireless charging device 200 wirelessly sends, in an induction or resonance manner. The second antenna 102 may be physically arranged at a location adjacent to the first antenna 101. According to various embodiments, the second antenna 102 may have one or more turns, length, volume, or the like, which is the same as or similar to the that of the first antenna 101 such that an induced current by the power signal induced to the first antenna 101 or obtained by resonating therewith is received.

The battery 103 may be connected to the power charging module 190 and may be charged under control of the power charging module 190. Power stored in the battery 103 may be provided to each of elements of the electronic device 100 under control of the processor 120. According to an embodiment, the power stored in the battery 103 may be used to control the state of a bridge circuit included in the first communication module 180.

Figure 3:
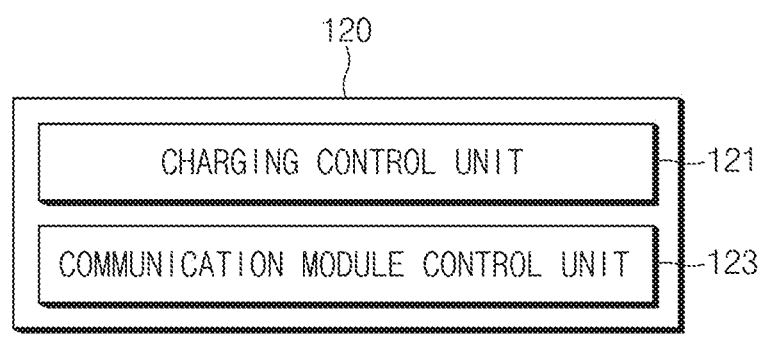
FIG. 3 is a drawing illustrating an example of a processor according to an embodiment of the present disclosure.

FIG. 3 is a drawing illustrating an example of a processor according to an embodiment of the present disclosure.

Referring to FIG. 3, the processor 120 may include a charging control unit 121 and a communication module control unit 123. According to various embodiments, each of the charging control unit 121 and the communication module control unit 123 may be implemented with one processor. Alternatively, at least a part of one processor may include the charging control unit 121 and the communication module control unit 123. Accordingly, a control unit described below may be a controller, a processor, or the like.

The charging control unit 121 may process a power signal associated with charging control of the electronic device 100. For example, the charging control unit 121 may determine whether a power signal of a magnitude or greater is detected by monitoring the power charging module 190. For example, as the electronic device 100 is placed on the wireless charging device 200, the charging control unit 121 may determine whether the power signal of a magnitude or greater is induced to the second antenna 102. If the power signal of the magnitude or greater is detected, the charging control unit 121 may determine that an event associated with charge start is generated and may send the generated event to the communication module control unit 123. Alternatively, the charging control unit 121 may determine whether the charging is maintained or whether the charging is ended or completed, based on a result of periodically determining whether the power signal of the magnitude or greater is detected through the second antenna 102. In the case where the charging is ended or completed, the charging control unit 121 may send the event (e.g., a charging end event or completion event) to the communication module control unit 123.

According to various embodiments, the charging control unit 121 may detect a power signal change of at least one (e.g., a rectifier circuit, a converter, or the like) among elements of the power charging module 190 connected with the second antenna 102. The charging control unit 121 may determine charge start or charge end based on the detected power signal change. If a charging current is induced, the charging control unit 121 may control a charger circuit such that the charger circuit charges the battery 103 based on the induced charging current.

If communication function execution is requested according to a user input, the communication module control unit 123 may control the first communication module 180 to send a specific communication signal. In the case where the first communication module 180 includes the NFC module, the communication module control unit 123 may send and receive a communication signal based on the first communication module 180. According to an embodiment, the communication module control unit 123 may control the switching state of the first communication module 180 based on an event that the charging control unit 121 sends. For example, if receiving, from the charging control unit 121, an event indicating that the charging starts or that the charging is in progress, the communication module control unit 123 may control the first communication module 180 to form the closed loop including the first antenna 101. If receiving an event indicating charge end or charge completion from the charging control unit 121, the communication module control unit 123 may restore the state of the first communication module 180 to an initial state. According to various embodiments, the communication module control unit 123 may output specific guide information in response to the state control of the first communication module 180. For example, the communication module control unit 123 may output the guide information indicating that the first communication module 180 is not available, with regard to the charging. In the case where the communication module control unit 123 receives an activation request of the first communication module 180 when the charging starts or when the charging is in progress, the communication module control unit 123 may output the guide information (e.g., a message indicating that the first communication module 180 is not available). The communication module control unit 123 may output use guide information indicating that the first communication module 180 is available again, based on the charge end or the charge completion.

Figure 4:
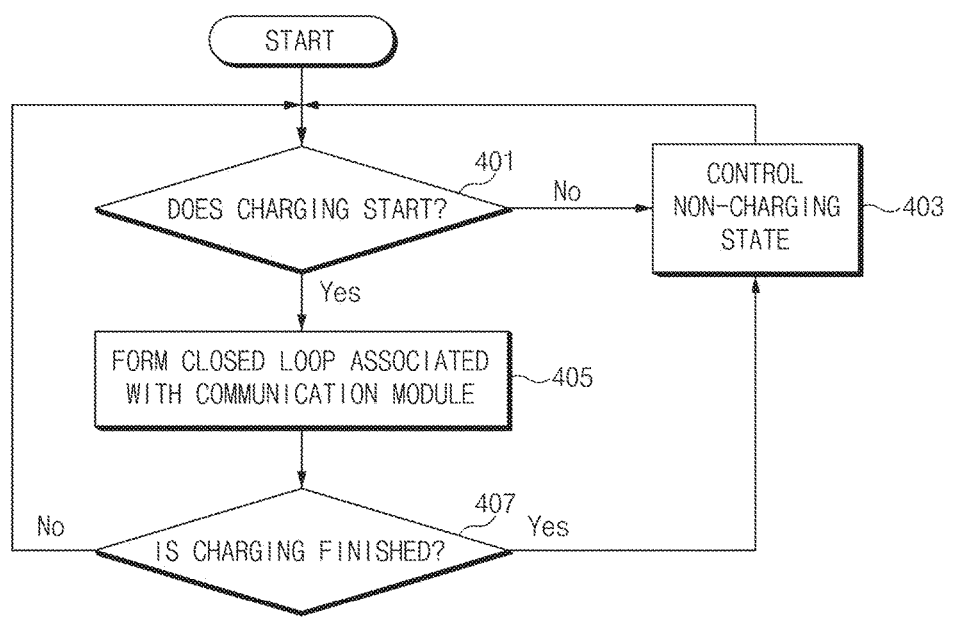
FIG. 4 is a flow chart illustrating an example of a control method and a leakage power processing method of an electronic device according to an embodiment of the present disclosure.

FIG. 4 is a flowchart illustrating an example of a control method and a leakage power processing method of an electronic device according to an embodiment of the present disclosure.

Referring to FIG. 4, with regard to the leakage power processing method associated with charging control of the electronic device, in operation 401, the processor 120 (e.g., the charging control unit 121) of the electronic device may determine whether an event associated with the charging is generated or whether the charging is in progress. In the case of a non-charging state, in operation 403, the processor 120 (e.g., the charging control unit 121) of the electronic device 100 may control the non-charging state. With regard to the controlling of the non-charging state, the processor 120 may periodically determine whether an event associated with charge start is generated. According to various embodiments, in the case where the bridge circuit of the first communication module 180 is maintained to an initial state and where the operating a user function (e.g., the MST function or NFC function) is requested, the processor 120 (e.g., the communication module control unit 123) may process the function.

If an event associated with the charging is generated, in operation 405, the processor 120 (e.g., the communication module control unit 123) may control forming the closed loop associated with a communication module (e.g., the first communication module 180). For example, the processor 120 may change the state of only upper switches or only lower switches or any combination of the upper switches and the lower switches of a bridge circuit, which is included in the communication module, into a turn-on state.

In operation 407, the processor 120 (e.g., the charging control unit 121) may determine whether an event associated with charge end is generated. If the event associated with the charge end is generated, the processor 120 may proceed to operation 403 to control the non-charging state. In this operation, the charging control unit 121 may send an event associated with charge completion or charge end to the communication module control unit 123. If the charging is completed, the communication module control unit 123 may end control of the bridge circuit performed with regard to the communication module. For example, the communication module control unit 123 may end switching control for forming the closed loop by using the bridge circuit and may restore the state of the bridge circuit to an initial state. As such, the communication module control unit 123 may save power that is consumed to control the switching of the bridge circuit. if the charging is maintained without generating an event associated with charge end, the processor 120 (e.g., the communication module control unit 123) may proceed to an operation before operation 405 to maintain a state in which the closed loop associated with the communication module is formed.

A leakage power processing method of an electronic device may include a first conductive pattern that sends and receives a communication signal associated with a communication function, a second conductive pattern that is arranged adjacent to the first conductive pattern and sends and receives a power signal used for charging, and a communication module electrically connected with the first conductive pattern. The method may include determining, at a processor of the electronic device, whether a power signal of a specific magnitude or greater is induced through the second conductive pattern and forming, at the processor of the electronic device, a closed loop including the first conductive pattern if a specific power signal is induced.

According to various embodiments, the forming of the closed loop may include at least one of simultaneously turning on upper switches of a bridge circuit included in the communication module and simultaneously turning on lower switches of the bridge circuit included in the communication module.

According to various embodiments, the method may further include preventing the closed loop from being formed if a magnitude of the signal induced through the second conductive pattern is changed to be smaller than or equal to the specific magnitude.

According to various embodiments, the preventing of the closed loop may include restoring states of upper switches or lower switches of the bridge circuit to a state before the closed loop is formed.

According to various embodiments, the method may further include outputting guide information indicating that an operation of the communication module is impossible during the charging.

According to various embodiments, the method may further include outputting guide information indicating that an operation of the communication module is possible when the charging is ended or interrupted.

Figure 5:
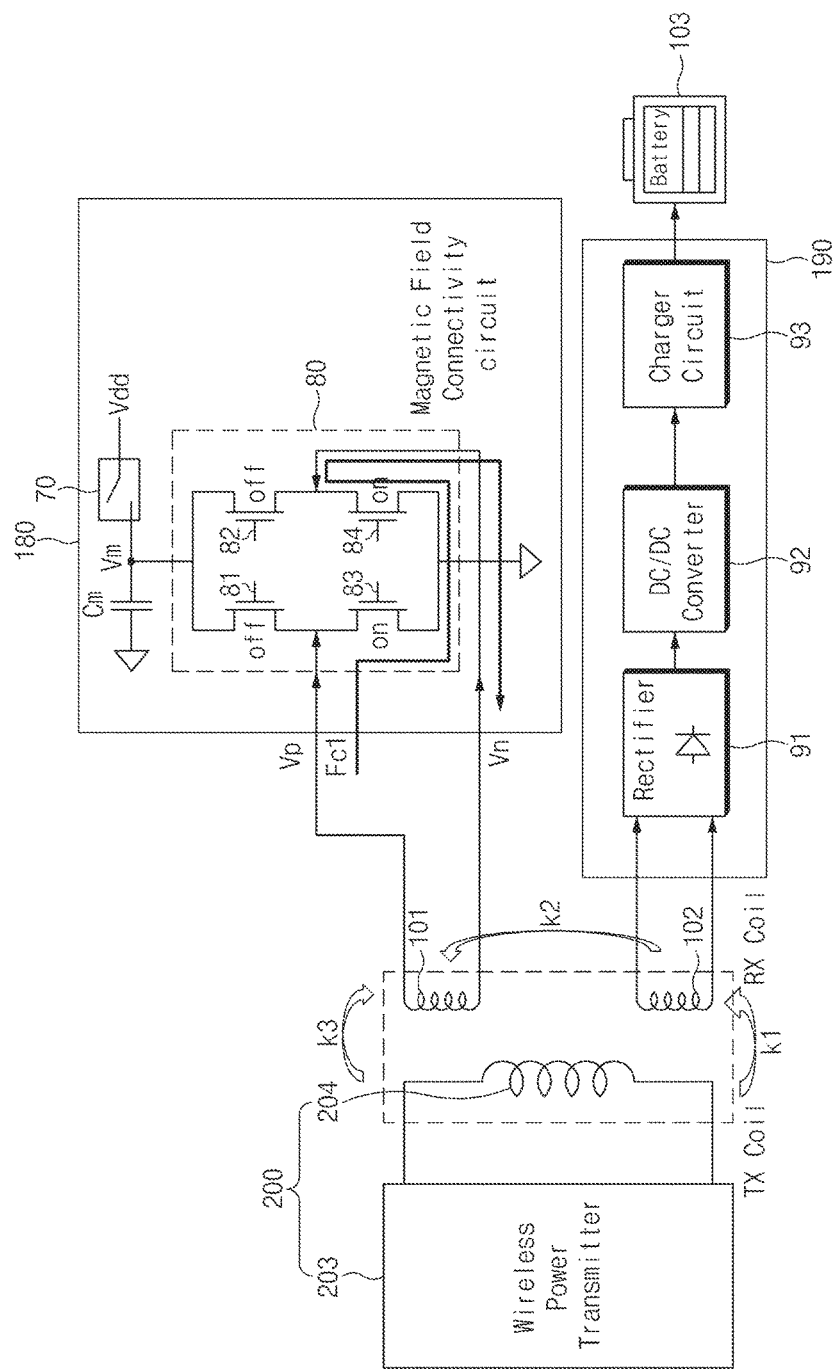
FIG. 5 is a block diagram illustrating an operation of a part of a configuration of a charging system according to an embodiment of the present disclosure.

FIG. 5 is a block diagram illustrating an operation of a part of a configuration of a charging system according to an embodiment of the present disclosure.

Referring to FIG. 5, a part of a configuration of the charging system may include a part of the wireless charging device 200 and the electronic device. The wireless charging device 200 may include a wireless power transmitter 203 and a transmitter antenna 204. A part of a configuration of the electronic device 100 may include the first communication module 180, the power charging module 190, the battery 103, the first antenna 101, and the second antenna 102.

The first communication module 180 may include, for example, a function control switch 70, a capacitor Cm, and a bridge circuit 80. In the first communication module 180, in the case where the bridge circuit 80 is in a turn-off state, the bridge circuit 80 may act as a PN diode full-bridge rectifier due to an influence of a body PN diode of each of switches constituting the bridge circuit 80.

The function control switch 70 may change the switching state by using power stored in the battery 103. For example, in the case where the first communication module 180 sends a specific communication signal by using the bridge circuit 80 in response to a request for performing a specific function, the function control switch 70 may have a turn-on state. The function control switch 70 may have a turn-off state during the charging operation. The capacitor Cm may be connected to one end of the function control switch 70 to bypass a leakage current (e.g., an alternative current (AC) component) that flows into the first communication module 180, thereby stabilizing the first communication module 180.

The bridge circuit 80 may include, for example, a first switch 81, a second switch 82, a third switch 83, and a fourth switch 84. The first switch 81 and the second switch 82 may be connected to one end of the function control switch 70 in parallel. The third switch 83 may be serially connected to the first switch 81, and the fourth switch 84 may be serially connected to the second switch 82. The third switch 83 and the fourth switch 84 may be connected to a ground terminal GND in common. Control lines (e.g., gate terminals) of the first switch 81, the second switch 82, the third switch 83, and the fourth switch 84 may be connected to the processor 120 (or a configuration of the electronic device arranged with regard to control of the first communication module 180). According to various embodiments, in the case where the first communication module 180 is a communication module for MST, the control lines of the first switch 81, the second switch 82, the third switch 83, and the fourth switch 84 may be connected to the processor 120. In the case where the first communication module 180 is a communication module for NFC, the control lines of the first switch 81, the second switch 82, the third switch 83, and the fourth switch 84 may be connected to the processor 120 or a control circuit placed in a NFC communication module. In the case where the control circuit is arranged in the NFC communication module, the NFC communication module may control the state of the bridge circuit 80 based on a control signal that the processor 120 sends to the NFC communication module (e.g., it may control the formation of the closed loop or control the bridge circuit 80 to perform a specific communication function).

The power charging module 190 may include the rectifier circuit 91, the converter 92, and the charger circuit 93. The rectifier circuit 91 may rectify the sent signal. For example, the rectifier circuit 91 may smooth a power signal generated in an AC manner through the second antenna 102. The converter 92 may convert the output of the rectifier circuit 91 into another voltage of a specific magnitude. For example, the converter 92 may convert direct current (DC) power of a first magnitude, which is rectified at the rectifier circuit 91, to DC power of a second magnitude that is capable of charging the battery 103. The charger circuit 93 may charge the battery 103 based on the output (e.g., the DC power of a second magnitude) of the converter 92. If the battery 103 is completely charged, the charger circuit 93 may notify the processor 120 of a charge completion state. The charger circuit 93 or the processor 120 may request the wireless charging device 200 to stop a power signal transmission according to charge completion. In this operation, the charger circuit 93 or the processor 120 may send a specific power signal associated with the charge completion to the wireless charging device 200.

In the charging system having the above-described configuration, the wireless power transmitter 203 may output a power signal of a specific magnitude by using the transmitter antenna 204. In the case, in the second antenna 102, a first power signal K1 (e.g., an induced current) of a specific magnitude coupled in an induction or resonance manner may be generated based on the transmitter antenna 204. The first power signal K1 that the second antenna 102 receives may be rectified by the rectifier circuit 91 of the power charging module 190 such that the first power signal K1 is changed into DC power of a specific magnitude by the converter 92. The charger circuit 93 may charge the battery 103 by using the DC power that the converter 92 converts.

According to an embodiment, the power signal K3 induced by at least a portion of the power signal, which the transmitter antenna 204 outputs, or obtained by resonating therewith may be formed in the first antenna 101 adjacent to the second antenna 102. Alternatively, the flow of the second power signal K2 of a specific magnitude coupled by the first power signal K1 flowing into the second antenna 102 may be formed in the first antenna 101. The flow of a third power signal K3 coupled by the power signal that the wireless power transmitter 203 sends may be formed in the first antenna 101. Accordingly, the power signals (K3 or K2) formed by the first antenna 101 may be sent to a communication module along the connected signal line. Accordingly, a voltage (e.g., Vp and Vn) of leakage power of a specific magnitude may be formed at opposite ends of the bridge circuit 80 along the connected signal line. Under control of the processor 120 (e.g., under control of a processor allocated to control the first communication module 180 or under control of the NFC communication module), the bridge circuit 80 may be switched such that the bridge circuit 80 forms a closed loop including the first antenna 101. Lower switches (e.g., the third switch 83 or the fourth switch 84) in the bridge circuit 80 may be turned on at the same time. As the lower switches are turned on at the same time, the closed loop including the first antenna 101, the third switch 83, and the fourth switch 84 may be formed.

If switches are configured such that the bridge circuit 80 forms the closed loop, the phase of the first leakage voltage Vp sent to the bridge circuit 80 may be changed as the first leakage voltage Vp passes through the bridge circuit 80. Alternatively, the phase of the second leakage voltage Vn sent to the bridge circuit 80 may be changed as the second leakage voltage Vn passes through the bridge circuit 80. Accordingly, the first leakage voltage Vp of leakage power and the second leakage voltage Vn of the leakage power may flows into the closed loop as signals (e.g., signals having a phase difference of 180 degrees) of different phases. As the first leakage voltage Vp and the second leakage voltage Vn pass through the bridge circuit 80, the first leakage voltage Vp and the second leakage voltage Vn having different phases may cancel out with each other. Accordingly, a node voltage Vm of a magnitude or less may be formed at a node between the bridge circuit 80 and the function control switch 70. As the closed loop is formed, a freewheeling current Fc1, which is induced through the first antenna 101 or obtained by resonating therewith flowing into only the closed loop and other elements of the first communication module 180 may be protected. As described above, as the leakage power sent through the first antenna 101 cancels out in the closed loop through the bridge circuit 80, the damage to the first communication module 180 may be minimized. For example, the damage to an overvoltage protection circuit (or an overcurrent protection circuit, or the like) included in the first communication module 180 may be prevented.

Figure 6:
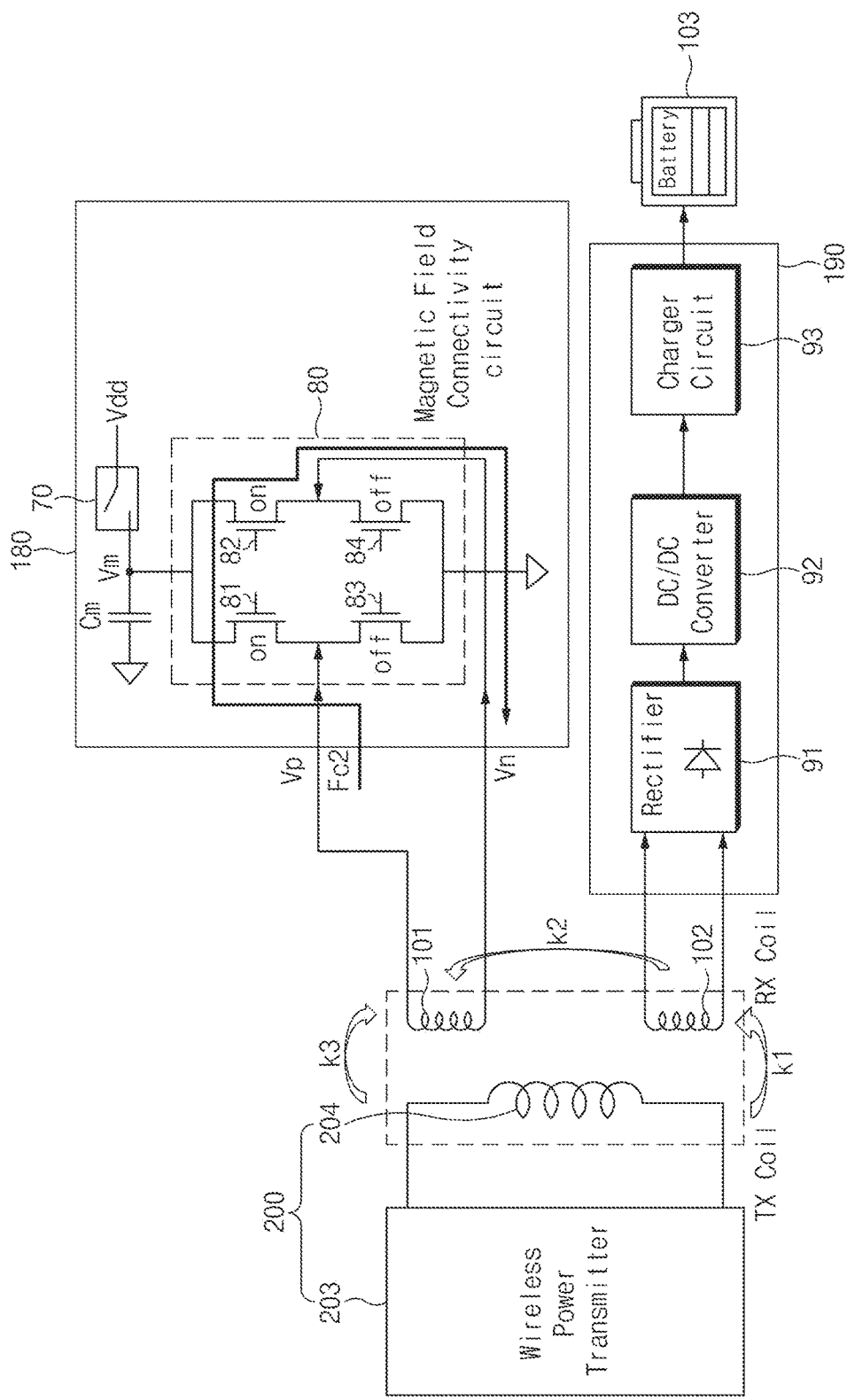
FIG. 6 is a block diagram illustrating another operation of a part of a configuration of a charging system according to an embodiment of the present disclosure.

FIG. 6 is a block diagram illustrating another operation of a part of a configuration of a charging system according to an embodiment of the present disclosure.

Referring to FIG. 6, a part of a configuration of the charging system according to an embodiment may include substantially the same configuration as a configuration described in FIG. 5. With regard to the charging operation of the configuration, the first communication module 180 of the electronic device 100 may perform forming the closed loop of the bridge circuit 80 during the charging that is different from the manner of charging described in FIG. 5. For example, the processor 120 may turn on upper switches (e.g., the first switch 81 or the second switch 82) in the bridge circuit 80 at the same time. As the upper switches are turned on at the same time, the closed loop including the first antenna 101, the first switch 81, and the second switch 82 may be formed. The first leakage voltage Vp may meet the second leakage voltage Vn, of which the phase is different from each other, through the first switch 81 and the second switch 82 of the bridge circuit 80, and thus two signals may cancel out. A freewheeling current Fc2 may flow into only the closed loop including the first antenna 101, the first switch 81, and the second switch 82. Accordingly, to be the same as or similar to the description in FIG. 5, the damage to other elements of the first communication module 180 due to leakage power may be prevented by forming the node voltage Vm of a magnitude or less at a node (one end of the node function control switch 70).

With regard to forming the closed loop, the above-mentioned description may be described as simultaneously turning on the lower switches (the third switch 83 and the fourth switch 84) of the bridge circuit 80 or simultaneously turning on the upper switches (the first switch 81 and the second switch 82). Here, the processor 120 may selectively turn on the upper switches and the lower switches at the same time. For example, the processor 120 may simultaneously turn on the upper switches (e.g., the first switch 81 or the second switch 82) and the lower switches (e.g., the third switch 83 or the fourth switch 84). Alternatively, the processor 120 may alternately turn on the upper switches and the lower switches at the same time during the charging.

According to various embodiments, an electronic device according to an embodiment may include a first conductive pattern (the first antenna, the first communication antenna, and the second communication antenna) that sends and receives a communication signal with regard to a communication function, a second conductive pattern (the second antenna, the first charging antenna, and the second charging antenna) that is arranged adjacent to the first conductive pattern and that sends and receives a power signal with regard to charging, a communication module connected with the first conductive pattern, a processor electrically connected with the communication module. The processor may be configured to control the communication module such that a closed loop including the first conductive pattern is formed if a specific power signal is supplied through the second conductive pattern.

According to various embodiments, the communication module may include a bridge circuit connected with the first conductive pattern.

According to various embodiments, the processor may be configured to simultaneously turn on only upper switches or only lower switches or any combination of the upper switches and the lower switches of the bridge circuit.

According to various embodiments, the processor may be configured to prevent the closed loop, which includes the first conductive pattern, from being formed if the supplying of the specific power signal is interrupted.

According to various embodiments, the processor may be configured to restore a bridge circuit of the communication module, which is used to form the closed loop including the first conductive pattern, to an initial state.

According to various embodiments, the communication module may be a MST module, and the second conductive pattern may be configured to receive a wireless power signal in a wireless power consortium (WPC) manner.

According to various embodiments, the communication module may be a NFC module, and the second conductive pattern may be configured to receive a wireless power signal in an alliance for wireless power (A4WP) manner.

According to various embodiments, the first conductive pattern and the second conductive pattern may be configured such that an induced signal has a same phase.

According to various embodiments, the electronic device may further include a shield layer having a surface. The first conductive pattern may include a pattern having one or more turns with respect to a point of the shield layer. The second conductive pattern may include a pattern having one or more turns with respect to the point of the shield layer and is arranged inside of the first conductive pattern.

According to various embodiments, the processor may be configured to prevent the closed loop from being formed if the charging is ended or completed.

According to various embodiments, the processor may be configured to output guide information indicating that an operation of the communication module is impossible, during the charging.

According to various embodiments, the processor may be configured to output guide information indicating that the operation of the communication module is possible, when the charging is ended or interrupted.

As described above, if wireless charging starts by using a full bridge structure, which is composed of four or more switches (e.g., a metal oxide silicon field effect transistor (MOSFET)) included in the communication module according to an embodiment of the present disclosure, differential voltages of leakage power may cancel out by turning on the switches such that the closed loop is capable of being formed. As such, a freewheeling current may be generated, thereby preventing the damage to a circuit by a high-voltage.

Accordingly, to prevent an influence due to loss of a circuit by leakage power, an influence due to the leakage power may be blocked according to a control operation of a specific configuration without an additional component (e.g., an AC isolation switch) or without replacing an internal voltage increasing component. Moreover, the present disclosure may be used to extend an outside area (a function of a relay resonator) of a conductive pattern as an operating area associated with wireless charging by using the induced freewheeling current.

Figure 7:
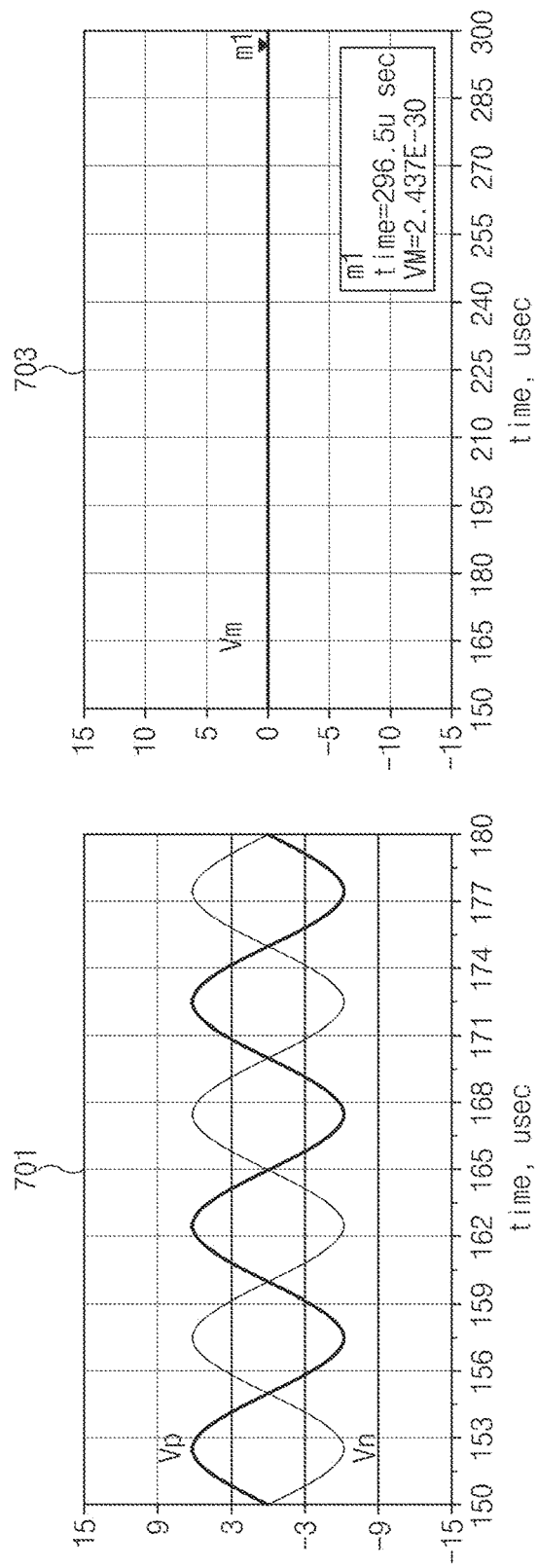
FIG. 7 is a view illustrating a leakage voltage waveform induced to a communication module according to an embodiment of the present disclosure.

FIG. 7 is a view illustrating a leakage voltage waveform induced to a communication module according to an embodiment of the present disclosure.

Referring to FIG. 7, in a situation in which the first communication module 180 does not operate, if the electronic device 100 is placed on the wireless charging device 200, as described above, a signal (e.g., an AC signal) of a specific magnitude may be induced or received (e.g., the reception of a signal sent in a resonance manner) to the first antenna 101 based on a power signal of the wireless charging device 200. Accordingly, the first leakage voltage Vp and the second leakage voltage Vn may be generated between the first antenna 101 and the bridge circuit 80 as illustrated in screen 701 of FIG. 7. As shown in FIG. 7, the first leakage voltage Vp and the second leakage voltage Vn may be signals that have a phase difference of 180 degrees.

If the first antenna 101 and the bridge circuit 80 form the closed loop based on switch control (e.g., turning on upper switches or lower switches at the same time) of the bridge circuit 80, the first leakage voltage Vp and the second leakage voltage Vn may cancel out with each other, as illustrated in screen 703, and thus a leakage voltage of a magnitude or less may be formed as the node voltage Vm of a node connected to the closed loop. For example, the node voltage Vm may be reduced to a threshold voltage (e.g., a voltage offset by a resistor (Rds_on) of the MOSFET) of each of the switches included in the bridge circuit 80. For example, the node voltage Vm may have a magnitude of 0.1 to 0.99 V (or 0.3 to 0.7 V).

Figure 8:
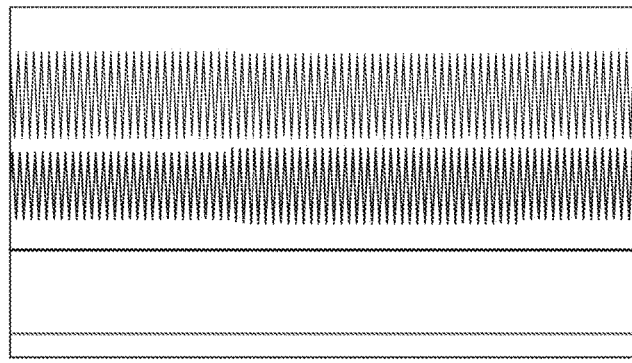
FIG. 8 is a view illustrating a signal change according to forming of a closed loop according to an embodiment of the present disclosure.
Figure 8:
Figure 8:
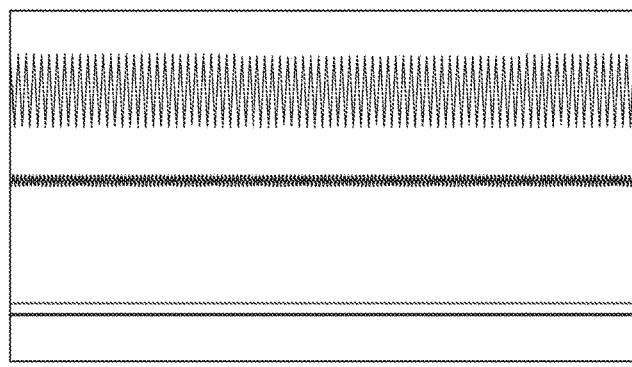

FIG. 8 is a view illustrating a signal change according to forming of a closed loop according to an embodiment of the present disclosure.

Referring to FIG. 8, before a closed loop is formed by using the bridge circuit 80, as illustrated in screen 801, an AC voltage induced to the first antenna 101 may be sent with a specific magnitude, and a leakage voltage (or the node voltage Vm) due to the AC voltage may be formed as a voltage (e.g., 8.4 V) of a magnitude or greater. The leakage voltage of the magnitude or greater may damage elements (e.g., an overvoltage protection circuit, an overcurrent protection circuit, the function control switch 70, and the like) included in the first communication module 180. Alternatively, the leakage voltage of the magnitude or greater may increase the damage to elements included in the first communication module 180, thereby making it possible to reduce the lifetime of each of the elements.

In the case where the closed loop is formed by using the bridge circuit 80, as illustrated in screen 803, an AC voltage induced to the first antenna 101 may be displayed as a form nearly similar to a DC form (the cancel of AC voltages). Accordingly, the leakage voltage (or the node voltage Vm) may be a voltage (e.g., 0.9 V) of a magnitude or less. The leakage voltage of a magnitude or less may belong to an allowable range of a durability design with respect to the elements constituting the first communication module 180. Accordingly, even though elements a price each of which is relatively high are not used, the first communication module 180 may be implemented, and thus the present disclosure may support obtaining security and reducing production costs.

Figure 9A:
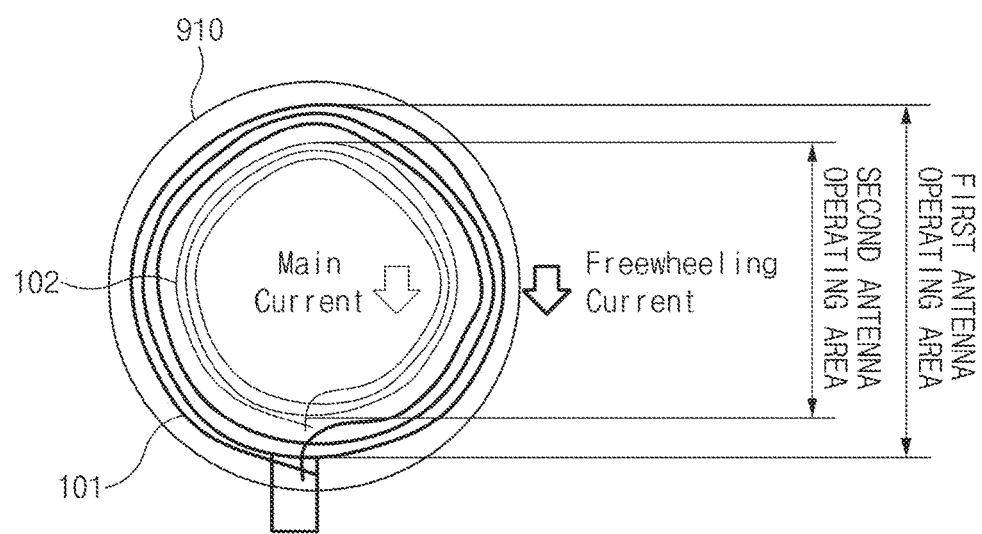
FIGS. 9A and 9B are views illustrating a form of each of a first antenna and a second antenna according to various embodiments of the present disclosure.
Figure 9B:
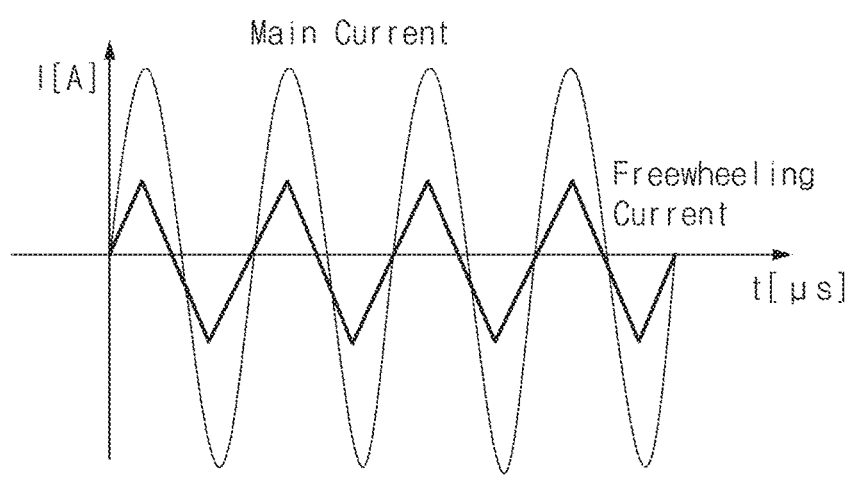

FIGS. 9A and 9B are views illustrating a form of each of a first antenna and a second antenna according to various embodiments of the present disclosure.

Referring to FIGS. 9A and 9B, as illustrated in the top 901 of FIG. 9A, an electronic device according to an embodiment of the present disclosure may include the first antenna 101, the second antenna 102, and a shield layer 910. For example, in the electronic device 100 according to an embodiment of the present disclosure, the first antenna 101 which has one or more turns with respect to the center of the shield layer 910 and which is wound in the form of a ring may be arranged, and the second antenna 102 which has one or more turns with respect to the center of the shield layer 910, which is wound in the form of a ring, and which is placed inside the first antenna 101 may be arranged. Additionally, the shield layer 910 may include metallic material, and thus an insulating layer may be arranged between the first antenna 101 and the second antenna 102. The electronic device 100 may include signal lines, which connect the first antenna 101 to the first communication module 180, and signal lines that connect the second antenna 102 to the power charging module 190. The first antenna 101, the second antenna 102, the shield layer 910, and the like may be arranged on, for example, a battery cover, a back cover, or the like of the electronic device 100.

As illustrated in the bottom 903 of FIG. 9B, the second antenna 102 associated with power charging may receive a signal of a first waveform induced from a signal that the wireless charging device 200 sends. The signal of the first waveform may include a main current used to charge the battery 103. The first antenna 101 may receive the signal of the second waveform induced based on the wireless charging device 200 and the second antenna 102. The signal of the second waveform may include a freewheeling current induced to the closed loop including the first antenna 101. One or more turns, the thickness of the line, the interval between lines, and the like of each of the first antenna 101 and the second antenna 102 may be determined such that the amplitude of a signal of a first waveform is different from that of a signal of a second waveform but the phase of the signal of the first waveform is the same as that of the signal of the second waveform as illustrated in FIG. 9B. As described above, in the case where the first antenna 101 is implemented such that the phase of the first antenna 101 is similar to that of the second antenna 102 used for charging, a freewheeling current that flows into the closed loop including the first antenna 101 may increase a current induced to the second antenna 102. Accordingly, the electronic device 100 according to an embodiment of the present disclosure may improve the efficiency of charging power by the second antenna 102.

As described above, if the first antenna 101 and the second antenna 102 are implemented such that a current phase induced to the first antenna 101 and the second antenna 102 is the same as a freewheeling current phase induced to an antenna, the field (e.g., the current field) of the second antenna 102 may be intensified (performing a relay resonator function), and thus a pattern area of the first antenna 101 may be used as a conductive pattern for charging when wireless charging operates.

Figure 10:
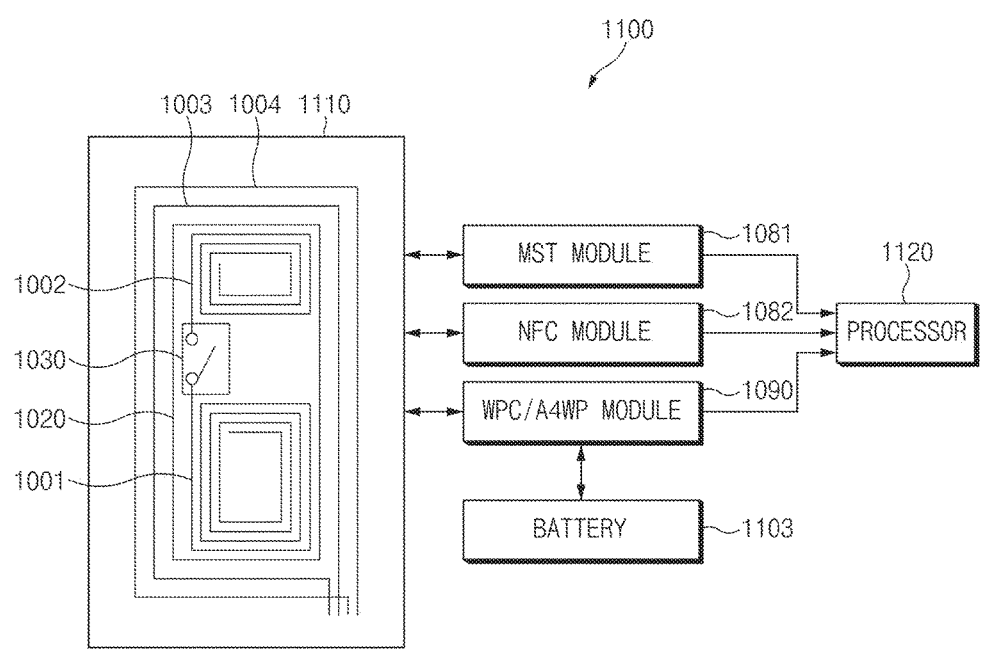
FIG. 10 is a flow chart illustrating a part of a configuration of an electronic device associated with charging according to an embodiment of the present disclosure.

FIG. 10 is a drawing illustrating a part of a configuration of an electronic device associated with charging according to an embodiment of the present disclosure.

Referring to FIG. 10, a part of a configuration of an electronic device 1100 according to an embodiment of the present disclosure may include, for example, a processor 1120 (e.g., the processor 120), an MST module 1081, an NFC module 1082, a WPC/A4WP module 1090, a battery 1103, and a terminal case 1110, and the terminal case 1110 may include at least one antenna loop, a switch, and the like. For example, in the WPC/A4WP module 1090, the rectifier circuit, the converter, and the like described in FIG. 5 and the like may be used with the rectifier circuit, the converter, and the like shared, and each of charger circuits in a WPC manner and an A4WP manner may be arranged. The WPC manner may include a signal induction manner. The A4WP manner may include a signal resonance manner. The MST module 1081 may include a bridge circuit and an element, which is required for other MST communications, described in FIG. 5 and the like. The NFC module 1082 may include a separate bridge circuit and a separate element required for other NFC communications that are independent of the MST module 1081.

In the terminal case 1110, a part of an area on which antennas are placed may be formed as a non-metal area. For example, the terminal case 1110 may include a first charging antenna 1001 used to charge the battery 1103 in the WPC manner, a second charging antenna 1004 used to charge the battery 1103 in the A4WP manner, a first communication antenna 1002 associated with the operating a communication function of the MST module 1081, and a second communication antenna 1003 associated with the operating a communication function of the NFC module 1082. Additionally, the terminal case 1110 may include a change switch 1030 that selectively connects or separates between the first charging antenna 1001 and the first communication antenna 1002. A start part and one end part of each of antennas may be implemented to be electrically connected to a corresponding module. Moreover, a shield layer 1020 may be arranged between the terminal case 1110 and antennas, that is, the first charging antenna 1001 and the first communication antenna 1002 that operate in the WPC manner. In the case where at least a part of the terminal case 1110 is implemented with metallic material, an area on which the second charging antenna 1004 is arranged may be a non-metallic area.

The processor 1120 may analyze a signal received from the wireless charging device 200 and may determine whether the wireless charging device 200 operates in the WPC manner or the A4WP manner, based on the analyzed result. The processor 1120 may form the closed loop by using the bridge circuit of a related communication module (e.g., the MST module 1081 or the NFC module 1082) based on a kind of the wireless charging device 200. For example, in the case where the battery 1103 is charged in the WPC manner, the processor 1120 may form the closed loop including the first communication antenna 1002 by using the bridge circuit included in the MST module 1081. Alternatively, in the case where the battery 1103 is charged in the A4WP manner, the processor 1120 may form the closed loop including the bridge circuit included in the NFC module 1082 and the second communication antenna 1003. According to various embodiments, while controlling the change switch 1030 to operate the MST module 1081, the processor 1120 may allow the first charging antenna 1001 and the first communication antenna 1002 to be connected thereto. Accordingly, the MST module 1081 may send a specific signal by using the first charging antenna 1001 and the first communication antenna 1002.

Figure 11:
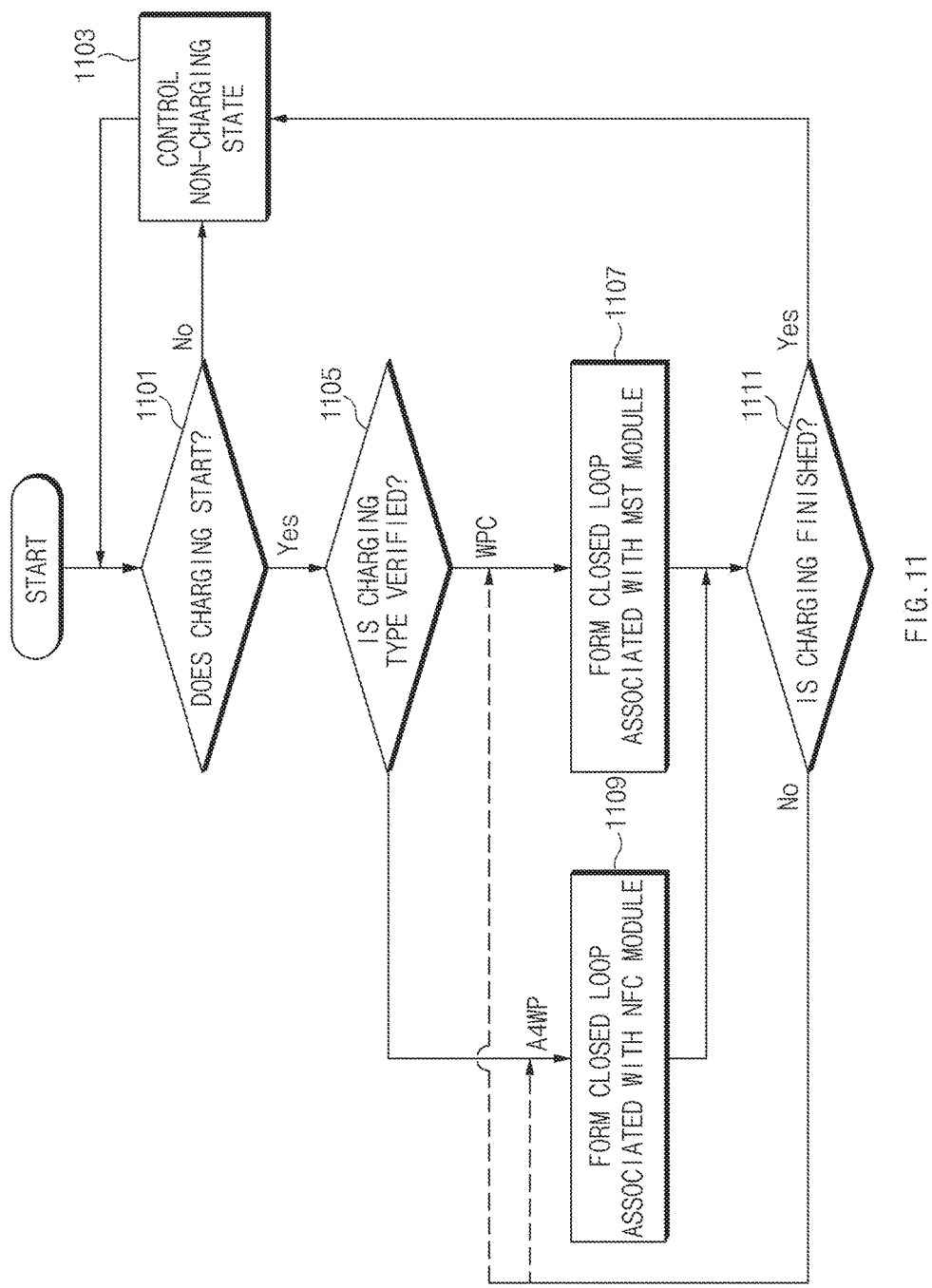
FIG. 11 is a drawing illustrating another example of a leakage power processing method according to an embodiment of the present disclosure.

FIG. 11 is a flow chart illustrating another example of a leakage power processing method according to an embodiment of the present disclosure.

Referring to FIG. 11, with regard to a leakage power processing method according to an embodiment of the present disclosure, in operation 1101, the processor 1120 (e.g., a charging control unit) of the electronic device 1100 may determine whether an event associated with charge start is generated. If the event associated with charge start is not generated, in operation 1103, the processor 1120 (e.g., a communication module control unit) may control a non-charging state. For example, the processor 1120 may process the state of the communication module (e.g., the MST module 1081 or the NFC module 1082) such that a standby state or initial state associated with operating a communication function is maintained.

If the event associated with charge start is generated, in operation 1105, the processor 1120 (e.g., a charging control unit) may verify a charging type. For example, the processor 1120 may analyze a signal that the wireless charging device 200 sends and may verify a type (e.g., the WPC or the A4WP) of the wireless charging device 200 based on the analyzed result. Alternatively, the processor 1120 may obtain information about a type according to a setting associated with charging or a user input. According to various embodiments, if a signal associated with wireless charging is received, the processor 1120 may output a popup window for verifying the type and may verify a type of the wireless charging device 200 based on a user selection.

According to an embodiment, in the case where the wireless charging device 200 is of the WPC type, in operation 1107, the processor 1120 (e.g., a communication module control unit) may form the closed loop associated with the MST module 1081. For example, the processor 1120 may control at least some of switches of the bridge circuit included in the MST module 1081 may form the closed loop including a communication antenna associated with the MST module 1081.

According to various embodiments, in the case where the wireless charging device 200 is of the A4WP type, in operation 1109, the processor 1120 (e.g., a communication module control unit) may form the closed loop associated with the NFC module 1082. For example, the processor 1120 may control at least some of switches of the bridge circuit included in the NFC module 1082 may form the closed loop including a communication antenna associated with the NFC module 1082. For example, the processor 1120 may control the bridge circuit of the MST module 1081 or the NFC module 1082 such that the closed loop is formed by simultaneously turning on only upper switches or only lower switches or any combination of the upper switches and the lower switches of the bridge circuit included in the MST module 1081 or the bridge circuit included in the NFC module 1082. Here, switching control of the bridge circuit of the MST module 1081 may be performed by the processor 1120. Switching control of the bridge circuit of the NFC module 1082 may be performed by the NFC module 1082.

In operation 1111, the processor 1120 (e.g., a charging control unit) may determine whether an event associated with charge end is generated. If an event associated with charge end or charge completion is generated, the processor 1120 may proceed to operation 1103 to control the non-charging state (e.g., the restoring of an initial state of the bridge circuit). In the case where the charging is maintained, the processor 1120 may proceed to operation 1107 or 1109 to control executing an operation associated with a corresponding block based on a current charging manner.

In the above-described description, the case where the electronic device 1100 supports the WPC manner or where the electronic device 1100 supports the WPC manner and the A4WP manner is exemplarily described. However, the present disclosure is not limited thereto. For example, the electronic device 1100 may be implemented in the form of supporting only the A4WP manner. In this case, the electronic device 1100 may be a communication module, and may include at least one of the MST module 1081 and the NFC module 1082. In the case where the NFC module 1082 is included, the electronic device 1100 may control forming the closed loop of the NFC module 1082 if operating with an operating frequency and the multiplication number of the A4WP. In this case, in this case where the charging is in progress, the NFC module 1082 control forming the closed loop based on a specific setting. In this case where the charging is interrupted, the NFC module 1082 control preventing the closed loop from being formed (e.g., the restoring of an initial state of the bridge circuit).

According to various embodiments, an electronic device according to an embodiment may include a first conductive pattern for communication (e.g., the second antenna 1002) that sends and receives a communication signal with regard to operating a first communication function, a second conductive pattern for communication (e.g., the third antenna 1003) that sends and receives a communication signal with regard to operating a second communication function, a first conductive pattern for charging (e.g., the first antenna 1001) that is arranged adjacent to the first conductive pattern for communication and sends and receives a power signal associated with charging, a second conductive pattern for charging (e.g., the fourth antenna 1004) that is arranged adjacent to the second conductive pattern for communication and sends and receives a power signal associated with charging, a first communication module (e.g., the MST module 1081) connected with the first conductive pattern for communication, a second communication module (e.g., the NFC module 1082) connected with the second conductive pattern for communication, and a processor electrically connected with the first communication module or the second communication module. The processor may be configured to verify a charging type if a charging event is generated and to form a closed loop including the first conductive pattern for communication or a closed loop including the second conductive pattern for communication based on the charging type.

According to various embodiments, the electronic device may include a first bridge circuit included in the first communication module and connected with the first conductive pattern for communication and a second bridge circuit included in the second communication module and connected with the second conductive pattern for communication.

According to various embodiments, the processor may be configured to simultaneously turn on only upper switches or only lower switches or any combination of the upper switches and the lower switches in a bridge circuit of a communication module determined according to the charging type.

According to various embodiments, if the charging is ended, the processor may control a bridge circuit, which is controlled such that the closed loop is formed, to prevent the closed loop from being formed.

According to various embodiments, the first communication module may be the MST module, and the first conductive pattern for charging may be implemented such that a wireless power signal of the WPC manner is received. The second communication module may be the NFC module, and the second conductive pattern for charging may be implemented such that a wireless power signal of the A4WP manner is received.

According to various embodiments, the first conductive pattern for charging and the first conductive pattern for communication may be implemented such that an induced signal has the same phase. The second conductive pattern for charging and the second conductive pattern for communication may be implemented such that an induced signal has the same phase According to various embodiments, in the electronic device, a metallic shield layer may be arranged under the first conductive pattern for communication and the first conductive pattern for charging, and an insulating layer may be arranged between the metallic shield layer and the conductive patterns.

According to various embodiments, the processor may control a communication module such that information about a charging type is outputted.

According to various embodiments, the processor may control the communication module such that guide information indicating that an operation of the communication module is impossible is outputted, during the charging or such that guide information indicating that an operation of the communication module is possible is outputted, when the charging is ended or interrupted.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of the present disclosure may be, for example, implemented by instructions stored in a non-transitory computer-readable storage media in the form of a program module. The instruction, when executed by a processor (e.g., the processor 120 or the processor 1120), may cause the one or more processors to perform a function corresponding to the instruction. The non-transitory computer-readable storage media, for example, may be the memory 130.

A non-transitory computer-readable recording medium may include a hard disk, a magnetic media, a floppy disk, a magnetic media (e.g., a magnetic tape), an optical media (e.g., a compact disc read only memory (CD-ROM) and a DVD, a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A non-transitory computer-readable recording medium may have recorded thereon at least one instruction and a processor that executes the instruction stored in the memory.

The instruction, which is executed by the processor, may cause the processor to perform a method. The method may include determining, at a processor of the electronic device whether a signal of a magnitude or greater is induced through the second conductive pattern and forming, at a processor of the electronic device, a closed loop including the first conductive pattern if the signal of the magnitude or greater is induced.

A module or a program module according to various embodiments of the present disclosure may include at least one of the above elements, or a part of the above elements may be omitted, or additional other elements may be further included. Operations performed by a module, a program module, or other elements according to various embodiments of the present disclosure may be executed sequentially, in parallel, repeatedly, or in a heuristic method. In addition, a part of operations may be executed in different sequences or may be omitted. Alternatively, other operations may be added.

As described above, to protect internal elements of an electronic device which are not associated with a power signal, various embodiments may support a method for processing leakage power.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device, comprising:
   a first conductive pattern that sends and receives a communication signal with regard to a communication function;
   a second conductive pattern that is arranged adjacent to the first conductive pattern and sends and receives a power signal with regard to charging;
   a communication hardware interface including a bridge circuit connected with the first conductive pattern; and
   a processor electrically connected with the communication hardware interface,
   wherein the processor is configured to control the communication hardware interface such that a closed loop including the first conductive pattern is formed if a specific power signal is supplied through the second conductive pattern, and
   wherein the first conductive pattern and the second conductive pattern are configured such that an induced signal has a same phase.
2. The electronic device of claim 1, wherein the processor is further configured to simultaneously turn on only upper switches or only lower switches or any combination of the upper switches and the lower switches of the bridge circuit.
3. The electronic device of claim 1, wherein the processor is further configured to prevent the closed loop, which comprises the first conductive pattern, from being formed if the supplying of the specific power signal is interrupted.
4. The electronic device of claim 3, wherein the processor is further configured to restore a bridge circuit of the communication hardware interface, which is used to form the closed loop, to an initial state.
5. The electronic device of claim 1,
   wherein the communication hardware interface is a magnetic secure transmission (MST) hardware interface, and wherein the second conductive pattern is configured to receive a wireless power signal in a wireless power consortium (WPC) manner.

6. The electronic device of claim 1,
wherein the communication hardware interface is a near field communication (NFC) hardware interface, and
wherein the second conductive pattern is configured to receive a wireless power signal in an alliance for wireless power (A4WP) manner.

7. The electronic device of claim 1, further comprising:
a shield layer having a surface,
wherein the first conductive pattern comprises a pattern having one or more turns with respect to a point of the shield layer, and
wherein the second conductive pattern comprises a pattern having one or more turns with respect to the point of the shield layer and is arranged inside the first conductive pattern.

8. The electronic device of claim 1, wherein the processor is further configured to prevent the closed loop from being formed if the charging is ended or completed.

9. The electronic device of claim 1, wherein the processor is further configured to output guide information indicating that an operation of the communication hardware interface is impossible, during the charging.

10. The electronic device of claim 9, wherein the processor is further configured to output guide information indicating that the operation of the communication hardware interface is possible, when the charging is ended or interrupted.

11. A leakage power processing method of an electronic device having a first conductive pattern that sends and receives a communication signal associated with a communication function, a second conductive pattern that is arranged adjacent to the first conductive pattern and sends and receives a power signal used for charging, and a communication hardware interface including a bridge circuit electrically connected with the first conductive pattern, the leakage power processing method comprising:
determining, by a processor of the electronic device, whether a specific power signal of a specified magnitude or greater is induced through the second conductive pattern; and
forming, by the processor of the electronic device, a closed loop comprising the first conductive pattern if the specific power signal of the specified magnitude or greater is induced,
wherein the forming of the closed loop comprises at least one of:
simultaneously turning on upper switches of a bridge circuit included in the communication hardware interface; or
simultaneously turning on lower switches of the bridge circuit included in the communication hardware interface, and
wherein a phase of an induced signal of the first conductive pattern is the same a phase of an induced signal of the second conductive pattern.

12. The leakage power processing method of claim 11, further comprising:
preventing the closed loop from being formed if a magnitude of the specific power signal induced through the second conductive pattern is changed to be smaller than or equal to the specified magnitude.

13. The leakage power processing method of claim 12, wherein the preventing of the closed loop comprises:
restoring a state of upper switches or lower switches of the bridge circuit to a state before the closed loop is formed.

14. The leakage power processing method of claim 11, further comprising:
outputting guide information indicating that an operation of the communication hardware interface is impossible, during the charging.

15. The leakage power processing method of claim 14, further comprising:
outputting guide information indicating that the operation of the communication hardware interface is possible, when the charging is ended or interrupted.

16. An electronic device, comprising:
a first conductive pattern for communication that sends and receives a communication signal with regard to operating a first communication function;
a second conductive pattern for communication that sends and receives a communication signal with regard to operating a second communication function;
a third conductive pattern for charging that is arranged adjacent to the first conductive pattern for communication and sends and receives a power signal associated with charging;
a fourth conductive pattern for charging that is arranged adjacent to the second conductive pattern for communication and sends and receives a power signal associated with charging;
a first communication hardware interface connected with the first conductive pattern for communication;
a second communication hardware interface connected with the second conductive pattern for communication; and
a processor electrically connected with the first communication hardware interface or the second communication hardware interface,
wherein the processor is configured to:
verify a charging type if a charging event is generated, and
form a closed loop comprising the first conductive pattern for communication or a closed loop comprising the second conductive pattern for communication based on the charging type.

17. The electronic device of claim 16, further comprising:
a first bridge circuit included in the first communication hardware interface and connected with the first conductive pattern for communication; and
a second bridge circuit included in the second communication hardware interface and connected with the second conductive pattern for communication,
wherein the processor is further configured to simultaneously turn on only upper switches or only lower switches or any combination of the upper switches and the lower switches in a bridge circuit of a communication hardware interface determined according to the charging type.

* * * * *